United States Patent
Jenkins et al.

(10) Patent No.: US 11,284,701 B2
(45) Date of Patent: Mar. 29, 2022

(54) MAGNETICALLY LOCKING TETHERING DEVICE

(71) Applicant: ZEBRA TECHNOLOGIES CORPORATION, Lincolnshire, IL (US)

(72) Inventors: Ian R. Jenkins, Stony Brook, NY (US); Leo K. Greeley, Shoreham, NY (US); Chi-Ming Wang, Taipei (TW); Huang Chih Huang, Taoyuan (TW); Sheng Du, East Setauket, NY (US); Jason H. Le Goff, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 174 days.

(21) Appl. No.: 16/581,055

(22) Filed: Sep. 24, 2019

(65) Prior Publication Data
US 2020/0154869 A1      May 21, 2020

Related U.S. Application Data

(60) Provisional application No. 62/769,341, filed on Nov. 19, 2018.

(51) Int. Cl.
*A45F 5/00* (2006.01)
*H04B 1/3888* (2015.01)

(52) U.S. Cl.
CPC ........... *A45F 5/004* (2013.01); *H04B 1/3888* (2013.01); *A45F 2200/0516* (2013.01)

(58) Field of Classification Search
CPC .. A45F 5/00; A45F 5/004; A45F 5/021; A45F 2005/008; A45F 2200/0516; H01R 13/6205; H04B 1/3888
See application file for complete search history.

(56) References Cited

U.S. PATENT DOCUMENTS

| | | | | |
|---|---|---|---|---|
| 9,526,321 | B1 * | 12/2016 | Nyako | H04M 1/04 |
| 2009/0229089 | A1 * | 9/2009 | Galant | A47F 7/024 24/303 |
| 2011/0309934 | A1 * | 12/2011 | Henson | G08B 13/1472 340/568.2 |
| 2014/0175135 | A1 * | 6/2014 | Paugh | H04M 1/04 224/219 |
| 2018/0028412 | A1 * | 2/2018 | Todd | A61J 1/00 |
| 2018/0293857 | A1 * | 10/2018 | Berglund | G08B 13/1454 |
| 2019/0105552 | A1 * | 4/2019 | James | A63C 7/12 |
| 2019/0235354 | A1 * | 8/2019 | Cleary | G03B 17/566 |
| 2020/0313346 | A1 * | 10/2020 | Hwang | H01R 13/60 |

* cited by examiner

*Primary Examiner* — Corey N Skurdal

(57) ABSTRACT

A tethering device includes a primary housing supporting a retraction mechanism; a secondary housing configured to be connected to a tethered object; a retractable tether extending from the retraction mechanism to the secondary housing to movably couple the secondary housing to the primary housing; a first magnet assembly supported by the primary housing; and a second magnet assembly supported by the secondary housing, wherein the second magnet assembly is configured to engage with the first magnet assembly to bias the secondary housing towards the primary housing.

16 Claims, 6 Drawing Sheets

MAGNETICALLY LOCKING TETHERING DEVICE

CROSS-REFERENCE TO RELATED APPLICATIONS

This application claims priority from U.S. provisional patent application No. 62/769,341, filed Nov. 19, 2018, the contents of which is incorporated herein by reference.

BACKGROUND

Mobile devices may be lost or broken by operators when in use, e.g. when the devices are dropped. Equipping operators with tethers, e.g. to retractably secure a mobile device to a cord worn about an operator's neck, may mitigate damage or loss due to dropping of the mobile device. However, retractable tethers may impede operator productivity.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
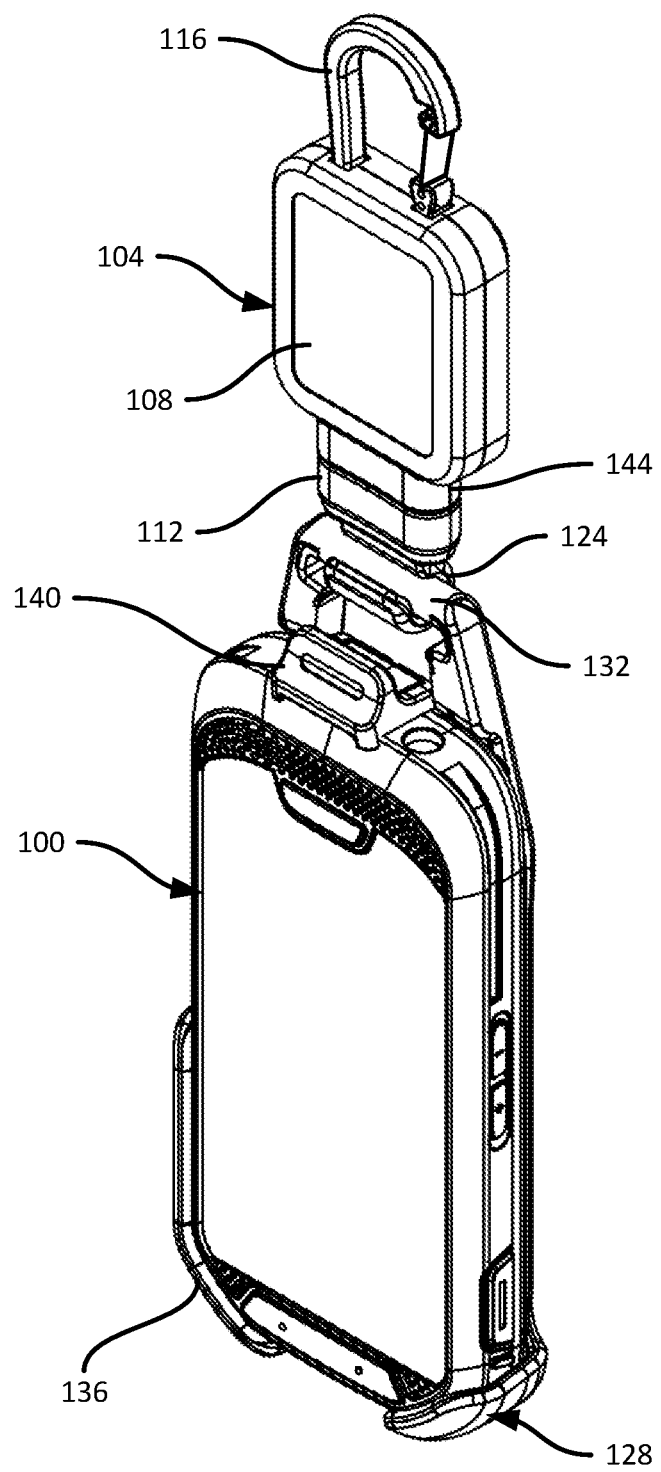
FIG. 1 is an isometric view of a tethering device and a mobile device coupled to the tethering device via an adapter, in a retracted position.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a tethering device comprising: a primary housing supporting a retraction mechanism; a secondary housing configured to be connected to a tethered object; a retractable tether extending from the retraction mechanism to the secondary housing to movably couple the secondary housing to the primary housing; a first magnet assembly supported by the primary housing; and a second magnet assembly supported by the secondary housing, wherein the second magnet assembly is configured to engage with the first magnet assembly to bias the secondary housing towards the primary housing.

Additional examples disclosed herein are directed to a self-aligning tethering device, comprising: a retraction mechanism; a retractable tether extending from the retraction mechanism and coupled to a tethered object to movably couple the tethered object to the retraction mechanism; a first pair of magnets coupled to the retraction mechanism; and a second pair of magnets coupled to the tethered object, wherein the second pair of magnets is configured to engage with the first pair of magnets to bias the tethered object towards the retraction mechanism in a predefined orientation.

Figure 2:
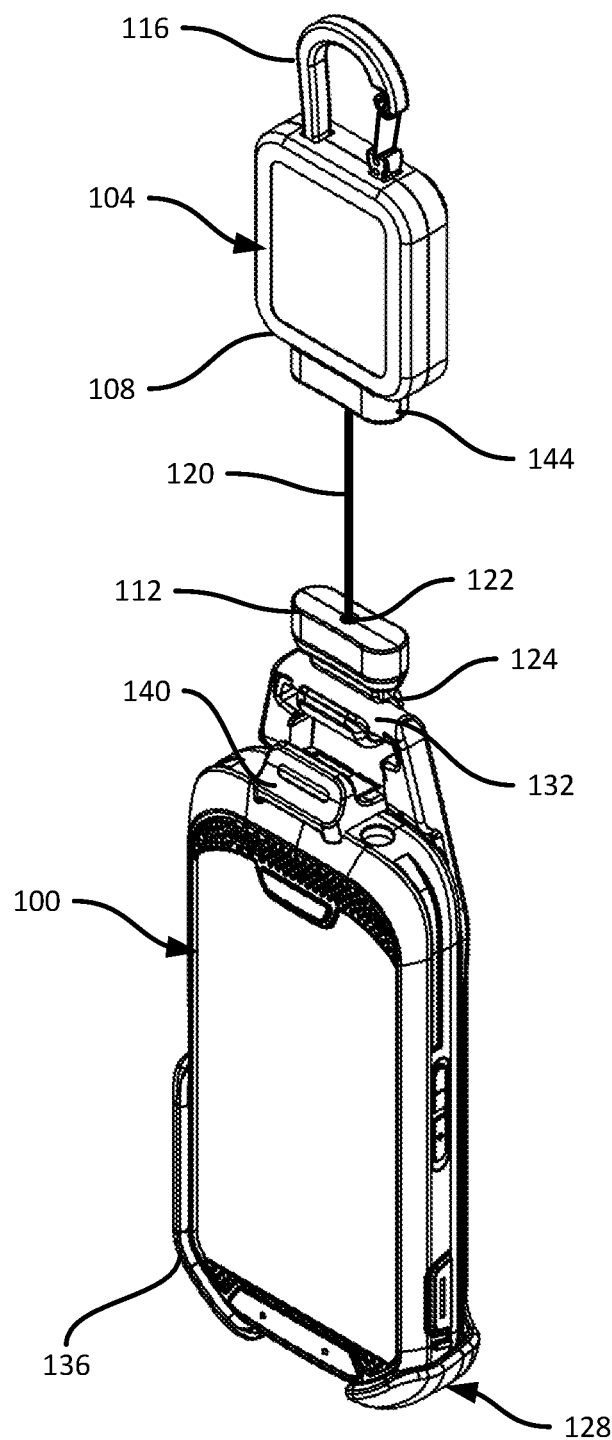
FIG. 2 is an isometric view of the tethering device of FIG. 1 in an extended position.

FIGS. 1 and 2 depict a tethered object in the form of a mobile device 100 (e.g. a handheld computing device). Mobile devices, and other tethered objects, may be dropped during use, which may result in damage to the tethered object and therefore impede productivity of the operator of the mobile device 100 or other tethered object. Other examples of tethered objects include a mobile scanner, a hospital communicator device such as a pager, an electronic identification display and/or access control apparatus having an electronic display, and the like.

Tethering devices may be employed with tethered objects such as the mobile device 100, coupling the tethered object to a retractable cord which is in turn fastened to the operator of the tethered object. However, some tethers, in order to exert sufficient retraction force on the tethered object to protect the object from drops and to return to the object to a fully retracted position, are difficult to extend for use by the operator. Other tethers may apply lower retraction forces, but such tethers may not fully retract the tethered objects, and may therefore fail to prevent damage due to dropping. The tethered object may also swing when not in use, striking nearby surfaces and/or the operator.

FIGS. 1 and 2 also illustrate a tethering device 104. In particular, FIG. 1 illustrates the tethering device 104 in a retracted position, while FIG. 2 illustrates the tethering device in an extended position. In contrast to the tethers mentioned above, the tethering device 104 enables the application of two distinct levels of retraction force on the mobile device 100. A first retraction force, also referred to herein as a locking force, is provided by magnetic assemblies in the tethering device 104 to retain the mobile device 100 in the fully retracted position illustrated in FIG. 1 when the mobile device 100 is not in use by an operator. The first retraction force must be overcome to transition the mobile device 100 to an extended position (shown in FIG. 2), but once the first retraction force is overcome, it is negligible. A second retraction force, meanwhile, is provided by a retractable tether of the tethering device 104. The second retraction force can be set lower than the first retraction force provided by the magnetic assemblies, but remains active throughout usage of the mobile device 100.

In other words, the above-mentioned magnetic arrangement, to be discussed below in greater detail, provides a magnetic locking mechanism to a low retraction force tether to keep a tethered object such as the mobile device 100 recoiled when not in use, while reducing the force required to keep the mobile device 100 in an extended position during use.

The tethering device 104 includes a primary housing 108 and a secondary housing 112. The primary housing can be coupled to an operator, for example by way of a lanyard (not shown) worn around the neck of the user and extending through a carabiner 116 or other suitable structure affixed to the primary housing 108. In other examples, the primary housing 108 can include a belt clip or the like for coupling to the operator, either instead of or in addition to the carabiner 116. The primary housing 108 also supports a retraction mechanism, such as a spring-loaded coiling mechanism, for a retractable tether 120, shown in FIG. 2. As shown in FIG. 2, the tether 120 extends from the primary housing 108 (and specifically from the retraction mechanism, where a portion of the tether 120 may be coiled around the retraction mechanism) to the secondary housing 112. In the present example, the tether 120 extends into an opening 122 of the secondary housing 112. The tether 120 therefore movably couples the primary and secondary housings 108 and 112.

The secondary housing 112 is connectable to the tethered object. Therefore, in the present example, the secondary housing 112 is connectable to the mobile device 100. A wide variety of mechanisms for coupling the secondary housing 112 to the mobile device 100 will occur to those skilled in the art. In the illustrated example, the secondary housing 112 includes a fastener 124 such as a hook, and the mobile device 100 is engaged with an adapter 128 that includes a bar 132 shaped and dimensioned to engage with the hook 124. In other examples, the bar 132 can be integrated with the mobile device 100. In further examples, the adapter can be integrated with the secondary housing 112.

The adapter 128, in the illustrated example, at least partially encases the mobile device 100. The engagement between the mobile device 100 and the adapter can be implemented as a pressure fit of the mobile device 100 into the adapter 128. For example, walls 136 of the adapter 128 can be resilient, and configured to form a perimeter that is smaller than a perimeter of the mobile device 100 itself. Thus, when the mobile device 100 is pressed into the adapter 128, the walls 136 deform to permit entry of the mobile device 100, and then return to a resting position forming the smaller perimeter mentioned above. In other examples, the walls 136 are rigid, and the mobile device 100 is inserted into the adapter 128 by sliding the mobile device 100 between the walls 136 and a back of the adapter, as will be discussed below. The adapter 128 may also include one or more resilient tabs 140 that engage the mobile device 100 to retain the mobile device 100 in the adapter 128, but that can be pulled back to ease removal of the mobile device 100 from the adapter 128.

As noted above, the tethering device 104 includes, in addition to the retraction mechanism mentioned above, magnetic assemblies to provide a locking function when the mobile device 100 is in the retracted position. In particular, the primary housing 108 includes a first magnet assembly in a distal portion 144 thereof, and the secondary housing 112 includes a second magnet assembly. As seen in FIG. 1, when the tethering device 104 is in the retracted position, the distal portion 144 of the primary housing 108 is adjacent to the secondary housing 112, and the above-mentioned magnet assemblies are sufficiently close to one another that the magnet assemblies attract one another and apply the above-mentioned first retraction force, retaining the secondary housing 112 against the primary housing 108. That is, the first retraction force biases the secondary housing 112 towards the primary housing 108.

Moving the mobile device 100 into the extended position shown in FIG. 2 therefore requires overcoming not only the retraction force imposed by the retraction mechanism, but also overcoming the locking force imposed by the magnet assemblies. However, once the locking force is overcome, the magnetic assemblies effectively cease to attract one another and the only force imposed on the mobile device 100 by the tethering device 104 (biasing the secondary housing 112, and therefore also the mobile device 100, towards the primary housing 108) is the retraction force via the tether 120.

Figure 3:
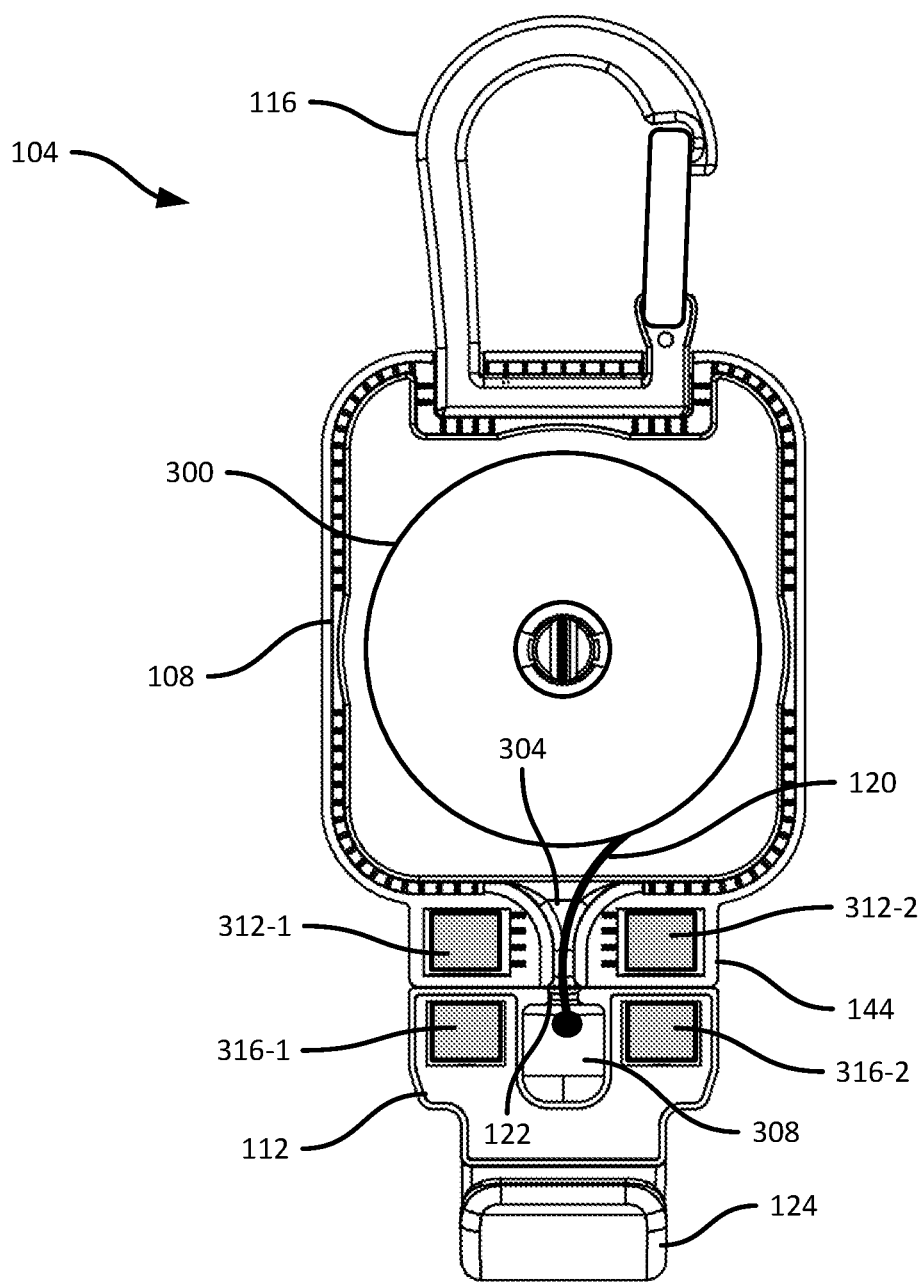
FIG. 3 is a front view of the tethering device of FIG. 1 with portions of the housing thereof omitted.

Turning to FIG. 3, the tethering device 104 is shown in isolation, with portions of the primary and secondary housings 108 and 112 omitted to reveal certain internal structures of the tethering device 104. In particular, the retraction mechanism 300 mentioned earlier is shown, e.g. as a spring-loaded reel or coil on which a coiled end of the tether 120 is rolled. As also seen in FIG. 3, a device end of the tether 120 extends from the retraction mechanism 300, through an opening 304 in the distal portion 144 of the primary housing 108, and into the secondary housing 112 via the opening 122. The device end of the tether 120 may be retained within a compartment 308 of the secondary housing 112 by knotting, attaching (e.g. via glue or any other suitable fastener).

As also shown in FIG. 3, the primary housing 108 contains the above-mentioned first magnet assembly. In the illustrated example, the first magnet assembly includes two magnets (e.g. rare earth magnets, ceramic magnets or the like) 312-1 and 312-2, disposed within the distal portion 144 on either side of the opening 304 through which the tether 120 extends.

The secondary housing 112 contains the above-mentioned second magnet assembly, including two magnets 316-1 and 316-2, disposed on either side of the opening 122 through which the tether 120 enters the secondary housing 112. The magnets 312 are spaced apart from one another, and the magnets 316 are also spaced apart from one another, with substantially the same spacing as between the magnets 312. Therefore, when the tethering device 104 is in the retracted position as shown in FIGS. 1 and 3, the magnet 312-1 aligns with one of the magnets 316-1 and 316-2, and the magnet 312-2 aligns with the other of the magnets 316-1 and 316-2. The magnets 312 and 316, when so aligned, attract each other to impose the above-mentioned locking force retaining the secondary housing 112 against the primary housing 108.

The polarities of the magnets 312 and 316 are selected to enable the above attraction. For example, the magnets 312 can have north or south poles facing towards the secondary housing 112, while magnets 316 can have south or north poles facing towards the primary housing 108. In other examples, the magnet 312-1 has a north pole facing towards the secondary housing 112 and the magnet 312-2 has a south pole facing towards the secondary housing 112. The magnets 316, in such examples, also have alternating polarities, e.g. with the magnet 316-1 having a south pole facing towards the primary housing 108 and the magnet 316-2 having a north pole facing towards the primary housing 108.

Figure 4:
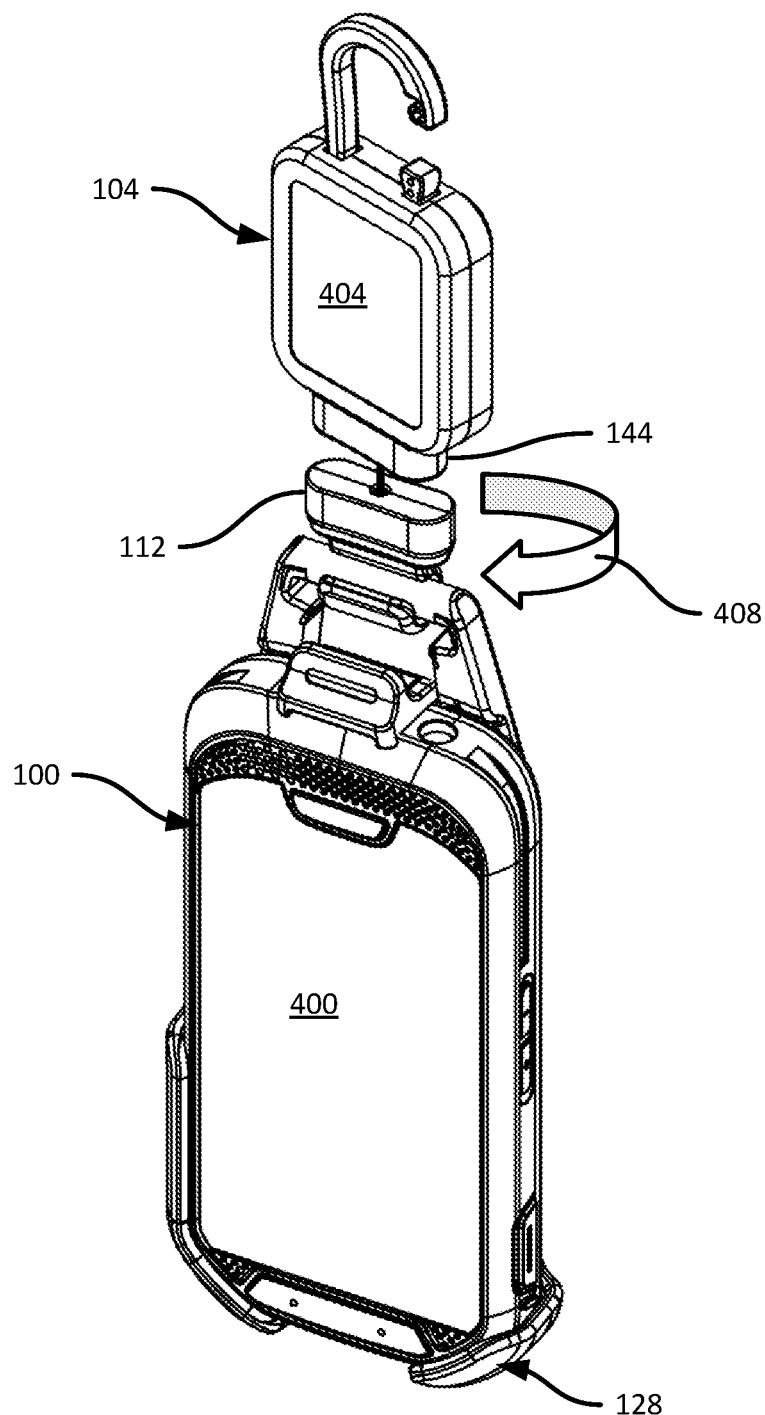
FIG. 4 is an isometric view of the tethering device of FIG. 1 illustrating a self-aligning feature of the tethering device.

The provision of pairs of magnets 312 and 316 may aid in aligning the secondary housing 112 relative to the primary housing 108. That is, referring to FIG. 4, when the secondary housing 112 and the mobile device 100 approach the primary housing 108 at an angle (e.g. such that the display 400 of the mobile device 100 is not parallel with the side 404 of the primary housing 108), the magnets 312 and 316 bias the secondary housing 112 in the direction 408 to place the display 404 substantially parallel with the side 404. In other words, the magnetic assemblies as shown in FIG. 3 enable the tethering device 104 to be self-aligning.

Figure 5:
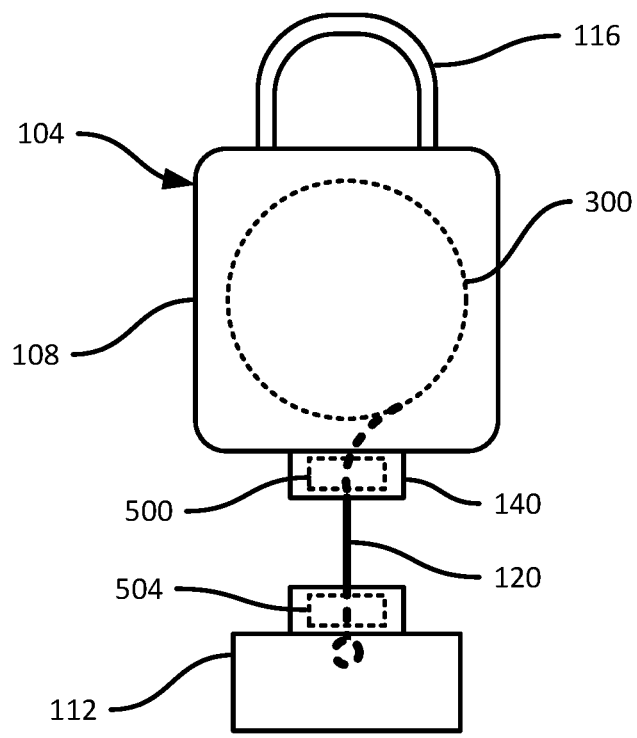
FIG. 5 is a diagram of another embodiment of a tethering device.
Figure 6:
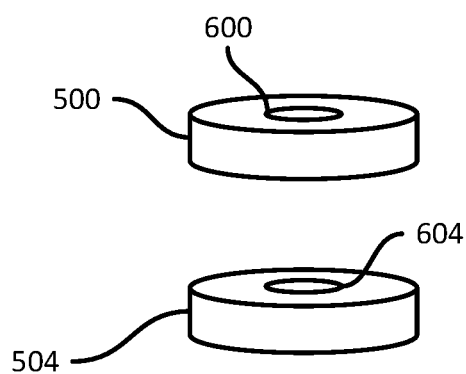
FIG. 6 is a diagram illustrating magnetic assemblies of the tethering device of FIG. 5 in isolation.

In other embodiments, the first and second magnet assemblies need not include two magnets as discussed above. For example, turning to FIG. 5, an embodiment of the tethering device 104 is illustrated in which the first magnet assembly of the primary housing 108 includes a single magnet 500. Further, the second magnet assembly of the secondary housing 108 includes a single magnet 504. The magnets 500 and 504 are shown in isolation in FIG. 6. As shown in FIG. 6, each magnet 500 and 504 is substantially cylindrical, and the magnets 500 and 504 include respective openings 600 and 604 therethrough. The tether 120 extends through the opening 600, out of the primary housing 108, into the secondary housing and through the opening 604 of the second magnet 504.

The extension of the tether 120 via the openings 600 and 604 in the magnets 500 and 504 serves to align the magnets 500 and 504 with each other as the secondary housing 112 approaches the primary housing 108, such that the magnets 500 and 504 attract one another and impose the above-mentioned locking force to retain the secondary housing 112 against the primary housing 108. The tether 120, in the illustrated example, extends substantially along an axis of each of the magnets 500 and 504. Moreover, the axes of the magnets 500 and 504 substantially coincide when the magnets 500 and 504 are engaged with each other. The magnets 500 and 504 may therefore be referred to as coaxial magnets.

As mentioned above, the force applied by the retraction mechanism 300 is smaller than the locking force applied by the magnet assemblies (e.g. the magnets 312 and 316, or the magnets 500 and 504), although the locking force is active only when a relatively small engagement distance separates the primary and secondary housings 108 and 112.

The retraction force applied by the retraction mechanism 300 may be equivalent to the weight of the mobile device 100. The retraction force applied by the retraction mechanism 300 may also exceed the weight of the mobile device 100, however. For example, the retraction force applied by the retraction mechanism 300 may be between about the weight of the mobile device 100 and about twice the weight of the mobile device 100.

The retraction force applied by the magnet assemblies (i.e. the locking force) is larger than the retraction force applied by the retraction mechanism 300. For example, the locking force may be greater than twice the weight of the mobile device 100. In some examples, the locking force is between about twice the weight of the mobile device 100 and about six times the weight of the mobile device 100. It will be understood, however, that the above ranges are provided merely as examples, and that various other retraction and locking forces may be implemented.

Figure 7:
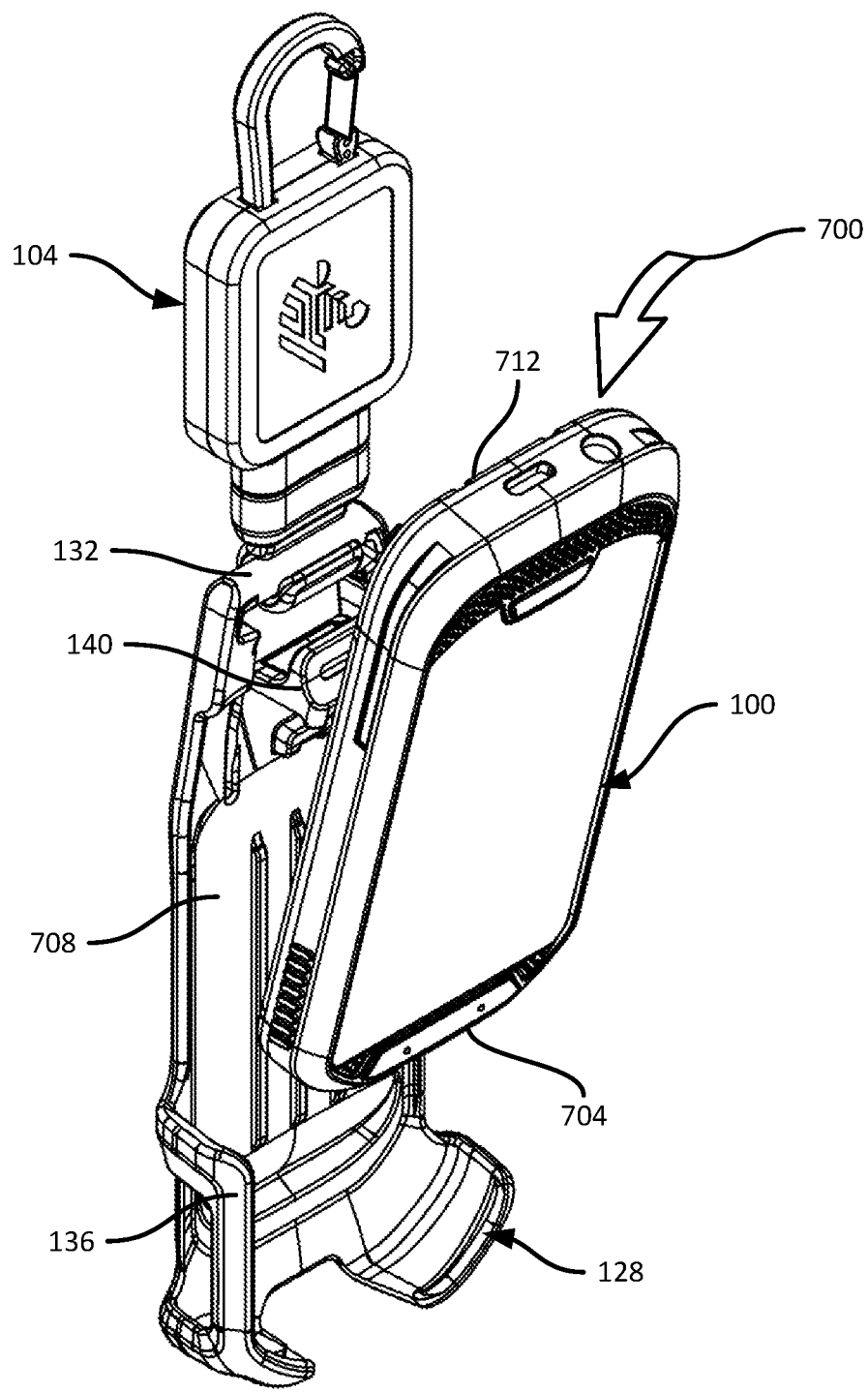
FIG. 7 is a diagram illustrating insertion of the mobile device of FIG. 1 into the adapter of FIG. 1.

Referring to FIG. 7, engagement of the mobile device 100 with the adapter 128 to connect the mobile device 100 to the tethering device 104 via the adapter 128 is illustrated. Specifically, to releasably secure the mobile device 100 to the adapter 128, the mobile device 100 is inserted into the adapter 128 by sliding the device 100 in the direction 700, to place a first end 704 of the mobile device 100 between the walls 136 and a back 708 of the adapter 128. A second end 712 of the mobile device 100 is then pressed towards the back 708, deforming the tab 140 upwards (i.e. towards the bar 132). When the mobile device 100 lies fully against the back 708 of the adapter 128, the tab 140 returns to the position shown in FIGS. 1 and 2, to retain the mobile device 128 in the adapter 128. The mobile device 100 can be removed by deforming the tab 140 as mentioned above, and sliding the mobile device 100 out of the adapter 128 in a direction opposite to the direction 700.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A tethering device comprising:
    a primary housing supporting a retraction mechanism;
    a secondary housing configured to be connected to a tethered object;
    a retractable tether extending from the retraction mechanism to the secondary housing to movably couple the secondary housing to the primary housing;
    a first magnet assembly supported by the primary housing; and
    a second magnet assembly supported by the secondary housing, wherein the second magnet assembly is configured to engage with the first magnet assembly to bias the secondary housing towards the primary housing;
    wherein:
        the first and second magnet assemblies are configured to apply a locking force biasing the secondary housing towards the primary housing when the first and second magnet assemblies are within an engagement distance of each other, and to release the locking force when the first and second magnet assemblies are not within the engagement distance,
        the retraction mechanism is configured to apply a retraction force biasing the secondary housing towards the primary housing, and
        the locking force is greater than the retraction force.

2. The tethering device of claim 1, wherein the secondary housing includes a fastener for connection to the tethered object.

3. The tethering device of claim 2, wherein the tethered object is a mobile computing device.

4. The tethering device of claim 3, wherein the fastener includes a hook for engaging with a bar coupled to the mobile computing device.

5. The tethering device of claim 4, wherein the mobile computing device is configured to be connected to the secondary housing via an adapter that includes the bar.

6. The tethering device of claim 1, wherein the first magnet assembly includes a first pair of magnets;
    wherein the second magnet assembly includes a second pair of magnets; and
    wherein the first pair of magnets and the second pair of magnets are configured to engage to bias the secondary housing towards the primary housing in at least one predefined orientation.

7. The tethering device of claim 6, wherein the tether extends from a first opening of the primary housing, and wherein the first pair of magnets are disposed on opposing sides of the first opening.

8. The tethering device of claim 7, wherein the tether extends into a second opening of the secondary housing, and wherein the second pair of magnets are disposed on opposing sides of the second opening.

9. The tethering device of claim 6, wherein the first pair of magnets are separated by a first distance, and wherein the second pair of magnets are separated by a second distance equal to the first distance.

10. The tethering device of claim 1, wherein the first magnet assembly includes a first coaxial magnet, and wherein the second magnet assembly includes a second coaxial magnet.

11. The tethering device of claim 10, wherein the first coaxial magnet and the second coaxial magnet include respective openings therethrough; and wherein the tether extends through the openings.

12. A self-aligning tethering device, comprising:
    a retraction mechanism;
    a retractable tether extending from the retraction mechanism and coupled to a tethered object to movably couple the tethered object to the retraction mechanism;
    a first pair of magnets coupled to the retraction mechanism; and
    a second pair of magnets coupled to the tethered object, wherein the second pair of magnets is configured to engage with the first pair of magnets to bias the tethered object towards the retraction mechanism in at least one predefined orientation;
    wherein:
        the first and second airs of magnets are configured to apply a locking force biasing the tethered object towards the retraction mechanism when the first and second pairs of magnets are engaged,
        the retraction mechanism is configured to apply a retraction force biasing the tethered object towards the retraction mechanism, and
        the locking force is greater than the retraction force.

13. The self-aligning tethering device of claim 12, further comprising:
    a primary housing supporting the retraction mechanism and the first pair of magnets; and
    a secondary housing supporting the second pair of magnets, wherein the secondary housing is coupled to the tethered object.

14. The self-aligning tethering device of claim 13, wherein the at least one predefined orientation places a surface of the tethered object parallel to a side of the primary housing.

15. The self-aligning tethering device of claim 14, wherein the tethered object is a mobile computing device, and wherein the surface of the tethered object is a display of the mobile computing device.

16. The self-aligning tethering device of claim 15, wherein the mobile computing device is configured to be coupled to the secondary housing via an adapter configured to releasably engage the mobile device and fasten to the secondary housing.

* * * * *